(12) United States Patent
Hong

(10) Patent No.: US 11,812,386 B2
(45) Date of Patent: Nov. 7, 2023

(54) CONFIGURATION ADJUSTMENT METHODS, APPARATUSES, ELECTRONIC DEVICE AND COMPUTER READABLE STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 306 days.

(21) Appl. No.: 17/288,562

(22) PCT Filed: Oct. 31, 2018

(86) PCT No.: PCT/CN2018/112893
§ 371 (c)(1),
(2) Date: Apr. 25, 2021

(87) PCT Pub. No.: WO2020/087321
PCT Pub. Date: May 7, 2020

(65) Prior Publication Data
US 2021/0400588 A1    Dec. 23, 2021

(51) Int. Cl.
*H04W 52/02*    (2009.01)
*H04W 36/06*    (2009.01)

(52) U.S. Cl.
CPC ....... *H04W 52/0251* (2013.01); *H04W 36/06* (2013.01); *H04W 52/0261* (2013.01)

(58) Field of Classification Search
CPC ............ H04W 52/0251; H04W 36/06; H04W 52/0261; H04W 24/04; H04W 24/10;
(Continued)

(56) References Cited

U.S. PATENT DOCUMENTS 8,699,464 B1 * 4/2014 Vivanco ................ H04W 48/18
370/331
10,080,173 B1 * 9/2018 Rai ........................ H04L 43/08
(Continued)

FOREIGN PATENT DOCUMENTS

CN    101350623 A    1/2009
CN    101938819 A    1/2011
(Continued)

OTHER PUBLICATIONS

European Patent Office, Extended European Search Report Issued in Application No. 18938829.1, dated May 3, 2022, Germany, 9 pages.
(Continued)

*Primary Examiner* — Ayaz R Sheikh
*Assistant Examiner* — David Zhijun Sun
(74) *Attorney, Agent, or Firm* — SYNCODA LLC; Feng Ma

(57) ABSTRACT

A configuration adjustment method includes: determining, among businesses run by the terminal, a target business for which a heat generating speed is greater than a first preset speed, when a temperature of the terminal is higher than a preset temperature; sending information of the target business to a base station; reducing a wireless transmission configuration for the target business according to a received first adjustment command of the base station for the target business.

15 Claims, 13 Drawing Sheets

(58) Field of Classification Search
CPC . H04W 52/0258; H04W 72/20; H04W 76/20; H04W 24/02; H04W 28/0215; Y02D 30/70; H04B 1/036
See application file for complete search history.

(56) References Cited

U.S. PATENT DOCUMENTS

| | | | | |
|---|---|---|---|---|
| 2010/0091747 | A1* | 4/2010 | Dorsey | H04W 52/0251 455/73 |
| 2010/0273517 | A1 | 10/2010 | Pinheiro et al. | |
| 2013/0007482 | A1 | 1/2013 | Rodriguez et al. | |
| 2013/0017851 | A1* | 1/2013 | Kim | H04W 72/51 340/584 |
| 2020/0036643 | A1* | 1/2020 | Jang | H04L 43/08 |

FOREIGN PATENT DOCUMENTS

| | | |
|---|---|---|
| CN | 101998448 A | 3/2011 |
| CN | 104427124 A | 3/2015 |
| CN | 104536483 A | 4/2015 |
| CN | 105756708 A | 7/2016 |
| CN | 106095556 A | 11/2016 |
| CN | 106155245 A | 11/2016 |
| CN | 106249842 A | 12/2016 |
| CN | 107168109 A | 9/2017 |
| CN | 107704053 A | 2/2018 |
| CN | 108401511 A | 8/2018 |
| CN | 108684217 A | 10/2018 |
| EP | 2461315 A2 | 6/2012 |
| EP | 2515509 A1 | 10/2012 |

OTHER PUBLICATIONS

Intellectual property India, Office Action Issued in Application No. 202147022916, dated Feb. 23, 2022, 7 pages.
State Intellectual Property Office of the People's Republic of China, Office Action and Search Report Issued in Application No. 2018800022878, dated Apr. 30, 2021, 20 pages.
ISA State Intellectual Property Office of the People's Republic of China, Written Opinion of the International Searching Authority Issued in Application No. PCT/CN2018/112893, dated Aug. 8, 2019, WIPO, 9 pages.
International Search Report in Application No. PCT/CN2018/112893, dated Aug. 8, 2019.

* cited by examiner

CONFIGURATION ADJUSTMENT METHODS, APPARATUSES, ELECTRONIC DEVICE AND COMPUTER READABLE STORAGE MEDIUM

CROSS-REFERENCE TO RELATED APPLICATION

This application is a U.S. national stage of International Application No. PCT/CN2018/112893 filed on Oct. 31, 2018, the disclosure of which is hereby incorporated by reference in its entirety.

TECHNICAL FIELD

The present disclosure relates to the field of communication technology, and in particular, to a configuration adjustment method, a configuration adjustment apparatus, an electronic device, and a computer-readable storage medium.

BACKGROUND

With the development of communication technology, 5G NR (New Radio) technology is becoming more and more mature. 5G NR technology can achieve a higher transmission rate by various methods, such as configuring high-order MIMO (Multiple-Input Multiple-Output), high-order modulation coding and a large bandwidth.

However, using the above methods, a terminal is required to increase power consumption, which leads to more heat being generated, thereby easily causing the problem of overheating of the terminal.

SUMMARY

In view of this, examples of the present disclosure propose configuration adjustment methods, configuration adjustment apparatuses, an electronic device, and a computer-readable storage medium.

According to the first aspect of the examples of the present disclosure, a configuration adjustment method is proposed, applied to a terminal, the method including:
determining, among businesses run by the terminal, a target business for which a heat generating speed is greater than a first preset speed, when a temperature of the terminal is higher than a preset temperature;
sending information of the target business to a base station;
reducing a wireless transmission configuration for the target business according to a received first adjustment command of the base station for the target business.

In some examples, sending the information of the target business to the base station includes:
sending an identifier of the target business to the base station.

In some examples, sending the information of the target business to the base station includes:
sending an identifier of the target business and a current quality of service of the target business to the base station.

In some examples, sending the information of the target business to the base station includes:
comparing a current quality of service of the target business with a quality of service required by the target business;
if the current quality of service of the target business is higher than the quality of service required by the target business, sending an identifier of the target business to the base station.

In some examples, reducing the wireless transmission configuration for the target business includes:
reducing a bandwidth configured for the target business, and/or reducing a carrier configured for the target business, and/or delaying time-domain resources configured for the target business.

In an example, the method further includes:
before determining, among the businesses run by the terminal, the target business for which the heat generating speed is greater than the first preset speed, determining a cause that leads to the temperature of the terminal being higher than the preset temperature;
wherein if the cause that leads to the temperature of the terminal being higher than the preset temperature is due to the businesses run by the terminal, determining, among the businesses run by the terminal, the target business for which the heat generating speed is greater than the first preset speed.

In some examples, determining, among the businesses run by the terminal, the target business for which the heat generating speed is greater than the first preset speed includes:
analyzing in real time the heat generating speed for each of the businesses run by the terminal, and/or determining the heat generating speed for each of the businesses run by the terminal according to pre-stored heat generating speeds for the businesses;
comparing the heat generating speed for each of the businesses with the first preset speed, and using one or more businesses for which the heat generating speeds are greater than the first preset speed as the target business.

In an example, the method further includes:
after reducing the wireless transmission configuration for the target business, if the temperature of the terminal is less than or equal to the preset temperature, sending information of the target business to the base station;
improving the wireless transmission configuration for the target business according to a received second adjustment command of the base station for the target business.

According to a second aspect of the examples of the present disclosure, a configuration adjustment method is proposed, applied to a base station, the method including:
receiving information of a target business which is sent by a terminal when a temperature of the terminal is higher than a preset temperature, wherein the target business is a business for which a heat generating speed is greater than a first preset speed among businesses run by the terminal;
generating a first adjustment command for the target business according to the information of the target business, wherein the first adjustment command is used to reduce a wireless transmission configuration for the target business;
sending the first adjustment command to the terminal.

In some examples, the information of the target business includes an identifier of the target business and a current quality of service of the target business, and generating the first adjustment command for the target business according to the information of the target business includes:
comparing the current quality of service of the target business with a quality of service required by the target business;
if the current quality of service of the target business is higher than the quality of service required by the target business, generating the first adjustment command.

In some examples, generating the first adjustment command for the target business according to the information of the target business includes:

determining a speed required by the target business for wireless transmission and/or a time delay required by the target business for wireless transmission;

if the speed required by the target business for wireless transmission is lower than a second preset speed, generating the first adjustment command for reducing a bandwidth configured for the target business, and/or if the time delay required by the target business for wireless transmission is greater than a preset time length, generating the first adjustment command for delaying time-domain resources configured for the target business.

In an example, the method further includes:

receiving information of the target business which is sent by the terminal when the temperature of the terminal is less than or equal to the preset temperature after the wireless transmission configuration for the target business is reduced;

generating a second adjustment command for the target business, wherein the second adjustment command is used to improve a wireless transmission configuration for the target business.

According to a third aspect of the examples of the present disclosure, a configuration adjustment apparatus is provided, applied to a terminal, the apparatus including:

a business determining module configured to determine, among businesses run by the terminal, a target business for which a heat generating speed is greater than a first preset speed, when a temperature of the terminal is higher than a preset temperature;

an information sending module configured to send information of the target business to a base station;

a configuration adjustment module configured to reduce a wireless transmission configuration for the target business according to a received first adjustment command of the base station for the target business.

In some examples, the information sending module is configured to send an identifier of the target business to the base station.

In some examples, the information sending module is configured to send an identifier of the target business and a current quality of service of the target business to the base station.

In some examples, the information sending module includes:

a comparison submodule configured to compare a current quality of service of the target business with a quality of service required by the target business;

a sending submodule configured to send an identifier of the target business to the base station if the current quality of service of the target business is higher than the quality of service required by the target business.

In some examples, the configuration adjustment module includes:

a bandwidth submodule configured to reduce a bandwidth configured for the target business; and/or a carrier submodule configured to reduce a carrier configured for the target business, and/or a delay submodule configured to delay time-domain resources configured for the target business.

In an example, the apparatus further includes:

a cause determining module configured to determine a cause that leads to the temperature of the terminal being higher than the preset temperature before determining, among the businesses run by the terminal, the target business for which the heat generating speed is greater than the first preset speed;

wherein the business determining module is configured to determine, among the businesses run by the terminal, the target business for which the heat generating speed is greater than the first preset speed if the cause that leads to the temperature of the terminal being higher than the preset temperature is due to the businesses run by the terminal.

In some examples, the business determining module includes:

a real-time analysis submodule configured to analyze in real time the heat generating speed for each of the businesses run by the terminal, and/or a pre-storing and determining submodule configured to determine the heat generating speed for each of the businesses run by the terminal according to pre-stored heat generating speeds for the businesses;

a speed comparison submodule configured to compare the heat generating speed for each of the businesses with the first preset speed, and use one or more businesses for which the heat generating speeds are greater than the first preset speed as the target business.

In some examples, the information sending module is further configured to send information of the target business to the base station if the temperature of the terminal is less than or equal to the preset temperature after the wireless transmission configuration for the target business is reduced;

the configuration adjustment module is further configured to improve the wireless transmission configuration for the target business according to a received second adjustment command of the base station for the target business.

According to a fourth aspect of the examples of the present disclosure, a configuration adjustment apparatus is provided, applied to a base station, and the apparatus including:

an information receiving module configured to receive information of a target business which is sent by a terminal when a temperature of the terminal is higher than a preset temperature, wherein the target business is a business for which a heat generating speed is greater than a first preset speed among businesses run by the terminal;

a command generation module configured to generate a first adjustment command for the target business according to the information of the target business, wherein the first adjustment command is used to reduce a wireless transmission configuration for the target business;

a command sending module configured to send the first adjustment command to the terminal.

In some examples, the information of the target business includes an identifier of the target business and a current quality of service of the target business, and the command generation module includes:

a comparison submodule configured to compare the current quality of service of the target business with a quality of service required by the target business;

a first generation submodule configured to generate the first adjustment command if the current quality of service of the target business is higher than the quality of service required by the target business.

In some examples, the command generation module includes:

a determining submodule configured to determine a speed required by the target business for wireless transmission and/or a time delay required by the target business for wireless transmission;

a second generation submodule configured to, if the speed required by the target business for wireless transmission is lower than a second preset speed, generate the first adjustment command for reducing a bandwidth configured for the target business, and/or if the time delay required by the target business for wireless transmission is greater than a preset time length, generate the first adjustment command for delaying time-domain resources configured for the target business.

In some examples, the information receiving module is further configured to receive information of the target business which is sent by the terminal when the temperature of the terminal is less than or equal to the preset temperature after the wireless transmission configuration for the target business is reduced;

the command generation module is further configured to generate a second adjustment command for the target business, wherein the second adjustment command is used to improve a wireless transmission configuration for the target business.

According to a fifth aspect of examples of the present disclosure, an electronic device includes:

a processor; and
a memory configured to store instructions executable by the processor;
wherein the processor is configured to execute the configuration adjustment method described in any of the foregoing examples.

According to a sixth aspect of the examples of the present disclosure, a computer-readable storage medium is provided, on which a computer program is stored, and when the program is executed by a processor, the configuration adjustment method described in any of the foregoing examples is implemented.

In one example, after receiving the first adjustment command sent by the base station, the wireless transmission configuration for the target business can be reduced according to the first adjustment command. Thus, in a case that the temperature of the terminal is high, the terminal can drop its own temperature as soon as possible by reducing the wireless transmission configuration for a target business with a faster heat generating speed, thereby avoiding a security problem due to the overheating of the terminal and ensuring normal operation of the terminal.

The wireless transmission configuration includes frequency-domain resources for wireless transmission, such as carrier and bandwidth, and may also include time-domain resources for wireless transmission.

For frequency-domain resources, reducing the wireless transmission configuration refers to reducing the bandwidth configured for the target business or reducing the carrier configured for the target business. Take bandwidth as an example, because in general, the wireless transmission through a larger bandwidth requires higher power consumption, by reducing the bandwidth configured for the target business, the power consumption of the target business for wireless communication can be reduced and the speed at which the terminal generates heat can be further decreased, thereby achieving the effect of dropping the temperature of the terminal.

For time-domain resources, reducing the wireless transmission configuration refers to delaying the time-domain resources configured for the target business. Since the overheating of the terminal generally occurs when the terminal runs multiple businesses at the same time, by delaying the time-domain resources configured for the target business, the number of the businesses run by the terminal simultaneously can be decreased and the speed at which the terminal generates heat can be further decreased, thereby achieving the effect of dropping the temperature of the terminal.

BRIEF DESCRIPTION OF THE DRAWINGS

To more clearly explain the technical solutions in examples of the present application, the drawings required in describing the examples will be briefly described below. Obviously, the drawings in the following description are only some examples of the present application. And a person of ordinary skill in the art can obtain other drawings based on these drawings without paying any creative effort.

DETAILED DESCRIPTION

The technical solutions in the examples of the present application will be described clearly and completely in conjunction with the drawings in the examples of the present application. Obviously, the described examples represent only part of the examples of the present application, but not all the examples. Based on the examples in the present application, all other examples obtained by those of ordinary skill in the art without creative effort fall within the protection scope of the present application.

Figure 1:
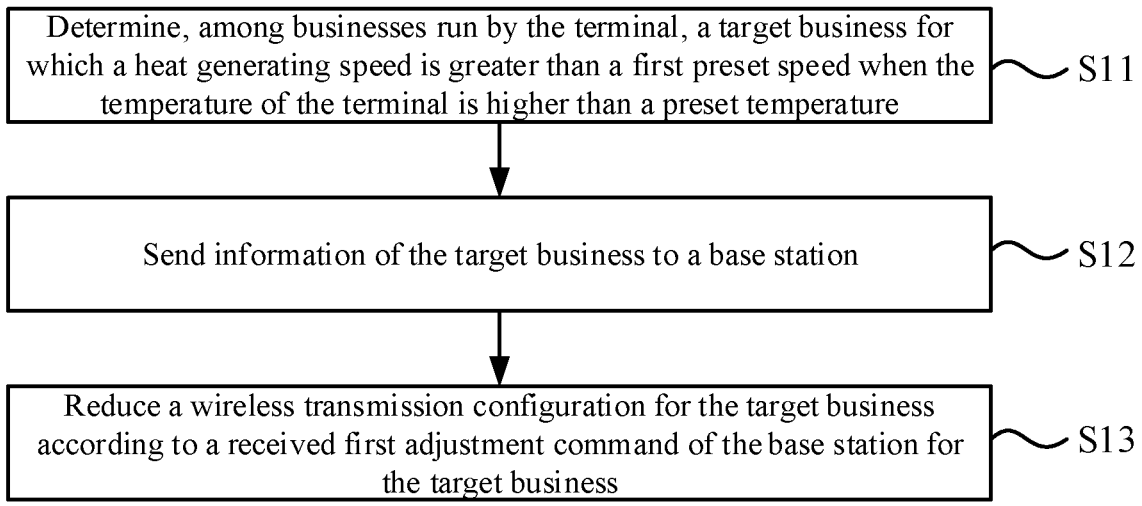
FIG. 1 is a schematic flowchart showing a configuration adjustment method according to an example of the present disclosure.

FIG. 1 is a schematic flowchart showing a configuration adjustment method according to an example of the present disclosure. The method can be applied to a terminal, where the terminal can be used as user equipment configured to communicate with a base station, and includes but not limited to electronic devices such as mobile phones, tablets, and wearable devices. The terminal can communicate with the base station based on 4G LTE technology, and can also communicate with the base station based on 5G NR technology.

As shown in FIG. 1, the configuration adjustment method may include the following steps.

In step S11, in a case where the temperature of the terminal is higher than a preset temperature, it is determined, among businesses run by the terminal, a target business for which a heat generating speed is greater than a first preset speed.

In one example, a temperature detection module may be provided in the terminal to detect the temperature of the terminal, such as detecting the temperature of a processor in the terminal or the temperature of an internal environment of the terminal. The detected temperature may be compared with the preset temperature. If the detected temperature is higher than the preset temperature, it means that the terminal is overheated.

Further, a target business for which the heat generating speed is greater than the first preset speed may be determined among the businesses run by the terminal. In an example, each business run by the terminal can be first determined, and then the target business can be determined by using at least one of the following two methods as needed.

Method One is to analyze in real time the heat generating speed for each of the businesses run by the terminal, and then to compare the analyzed speed with a first preset speed to determine a target business for which the heat generating speed is greater than the first preset speed.

Method Two is to pre-store, for each type of business supported by the terminal, a speed of generating heat (also referred to as a heat generating speed) by the terminal when running the business, and then to search the pre-stored heat generating speeds for the heat generating speeds for the businesses run by the terminal, and then to compare the found heat generating speeds with the first preset speed to determine a target business for which the heat generating speed is greater than the first preset speed.

It should be noted that the determined target business can include one business or a plurality of businesses, which depends on the actual situation.

In step S12, information of the target business is sent to the base station.

In one example, the terminal may communicate with the base station based on 5G NR technology or 4G LTE technology, which is not limited in the example of the present disclosure.

In an example, the information of the target business includes at least an identifier of the target business, and may also include a current quality of service (QoS for short) of the target business.

When receiving the information of the target business sent by the terminal, the base station may generate a first adjustment command for reducing a wireless transmission configuration for the target business, and send the first adjustment command to the terminal.

In step S13, the wireless transmission configuration for the target business is reduced according to a received first adjustment command of the base station for the target business.

In one example, after receiving the first adjustment command sent by the base station, the wireless transmission configuration for the target business can be reduced according to the first adjustment command. Thus, in a case that the temperature of the terminal is high, the terminal can drop its own temperature as soon as possible by reducing the wireless transmission configuration for a target business with a faster heat generating speed, thereby avoiding a security problem due to the overheating of the terminal and ensuring normal operation of the terminal.

The wireless transmission configuration includes frequency-domain resources for wireless transmission, such as carrier and bandwidth, and may also include time-domain resources for wireless transmission.

For frequency-domain resources, reducing the wireless transmission configuration means reducing the bandwidth configured for the target business or reducing the carrier configured for the target business. Take bandwidth as an example, because in general, the wireless transmission through a larger bandwidth requires higher power consumption, by reducing the bandwidth configured for the target business, the power consumption of the target business for wireless communication can be reduced and the speed at which the terminal generates heat can be further decreased, thereby achieving the effect of dropping the temperature of the terminal.

For time-domain resources, reducing the wireless transmission configuration refers to delaying the time-domain resources configured for the target business. Since the overheating of the terminal generally occurs when the terminal runs multiple businesses at the same time, by delaying the time-domain resources configured for the target business, the number of the businesses run by the terminal simultaneously can be decreased and the speed at which the terminal generates heat can be further decreased, thereby achieving the effect of dropping the temperature of the terminal.

Figure 2:
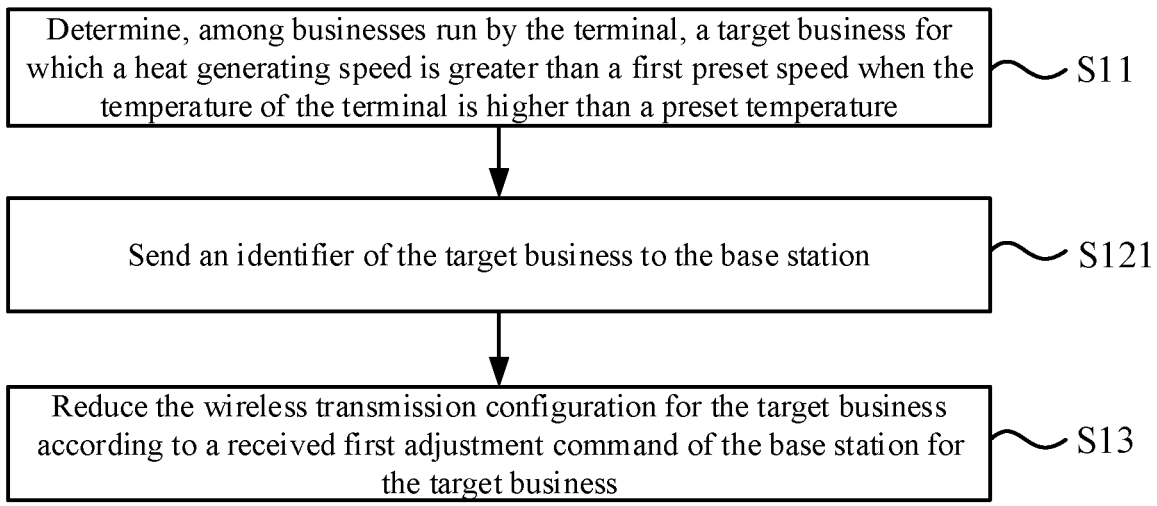
FIG. 2 is a schematic flowchart showing another configuration adjustment method according to an example of the present disclosure.

FIG. 2 is a schematic flowchart showing another configuration adjustment method according to an example of the present disclosure. As shown in FIG. 2, based on the example shown in FIG. 1, sending the information of the target business to the base station includes the following.

In step S121, an identifier of the target business is sent to the base station.

In an example, the information of the target business sent by the terminal to the base station may only include the identifier of the target business. In this case, when receiving the information of the target business sent by the terminal, the base station may generate a first adjustment command for reducing the wireless transmission configuration for the target business, and send the first adjustment command to the terminal. The process of such operation is simple, and neither the terminal nor the base station needs to perform excessive analysis on the target business.

Figure 3:
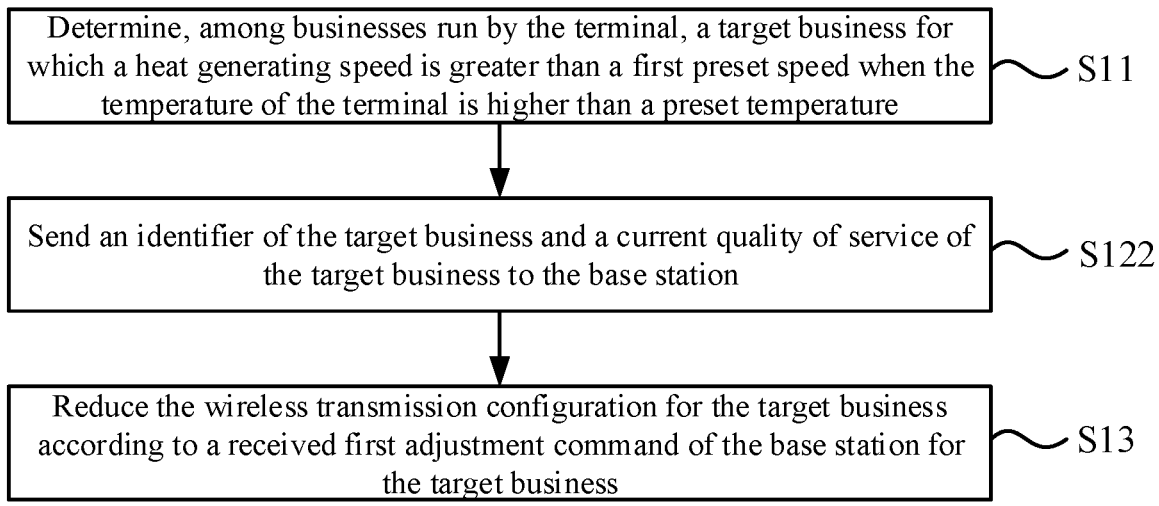
FIG. 3 is a schematic flowchart showing yet another configuration adjustment method according to an example of the present disclosure.

FIG. 3 is a schematic flowchart showing yet another configuration adjustment method according to an example of the present disclosure. As shown in FIG. 3, based on the example shown in FIG. 1, sending the information of the target business to the base station includes the following.

In step S122, an identifier of the target business and a current quality of service of the target business are sent to the base station.

In an example, the information of the target business sent by the terminal to the base station may include the identifier of the target business and the current quality of service of the target business. In this case, the base station can compare the current quality of service of the target business with the quality of service required by the target business. The quality of service required by the target business refers to the lowest quality of service required during the normal operation of the target business. The quality of service includes transmission speed, transmission delay and so on.

If the current quality of service of the target business is higher than the quality of service required by the target business, it means that the current quality of service of the target business is too high, and there is a certain degree of waste besides that the lowest quality of service required during the normal operation of the target business is met. Taking the transmission speed as an example, the transmission speed is too high means that too much bandwidth is configured for the target business, and therefore, the first adjustment command can be generated to instruct the terminal to reduce the bandwidth configured for the target business.

If the current quality of service of the target business is not higher than the quality of service required by the target business, it means that the current quality of service of the target business is not high, that is, the current quality of service of the target business just meets or does not meet the lowest quality of service required during the normal operation of the target business. Therefore, in order to ensure the normal operation of the target business as much as possible, the wireless transmission configuration for the target business should not be reduced, that is, there is no need to generate the first adjustment command.

Different from the example shown in FIG. 2, in the example shown in FIG. 3, the terminal not only sends the identifier of the target business to the base station, but also sends the current quality of service of the target business to the base station. The base station needs to compare the current quality of service of the target business and the quality of service required by the target business, and determine whether to generate the first adjustment command according to the comparison result.

Figure 4:
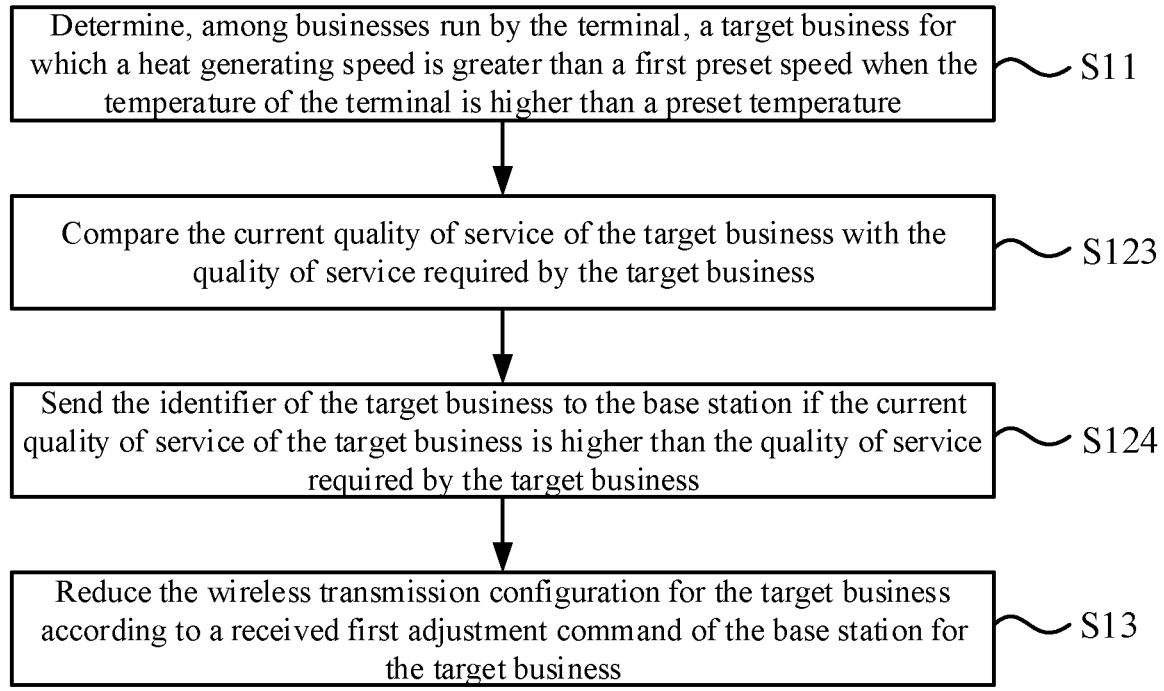
FIG. 4 is a schematic flowchart showing yet another configuration adjustment method according to an example of the present disclosure.

FIG. 4 is a schematic flowchart showing yet another configuration adjustment method according to an example of the present disclosure. As shown in FIG. 4, based on the example shown in FIG. 1, sending the information of the target business to the base station includes the following.

In step S123, the current quality of service of the target business is compared with the quality of service required by the target business.

In step S124, if the current quality of service of the target business is higher than the quality of service required by the target business, the identifier of the target business is sent to the base station.

In one example, different from the example shown in FIG. 3, the terminal can compare the current quality of service of the target business with the quality of service required by the target business. If the current quality of service of the target business is higher than that required by the target business, it means that the current quality of service of the target business is too high, and the identifier of the target business can be sent to the base station so that the base station generates the first adjustment command. If the current quality of service of the target business is not higher than the quality of service required by the target business, it means that the current quality of service of the target business is not high, and there is no need to send the identifier of the target business to the base station to reduce the wireless transmission configuration for the target business.

Based on the example shown in FIG. 2, neither the terminal nor the base station needs to perform excessive analysis on the target business, and the base station can send the first adjustment command to the terminal. Although the burden on the terminal and the base station is less, the quality of service of the target business is not analyzed, which may impose a negative impact on the quality of service of the target business.

Based on the example shown in FIG. 3, the terminal can send the identifier of the target business and the current quality of service of the target business to the base station, and the base station compares the current quality of service of the target business with the quality of service required by the target business. In this way, the burden on the terminal is less, but the burden on the base station is more.

Based on the example shown in FIG. 4, the terminal can compare the current quality of service of the target business with the quality of service required by the target business. In this way, the burden on the terminal is more, but the burden on the base station is less.

The specific choice of the above-mentioned different ways can be determined according to actual needs, such as the performance of the terminal, the performance of the base station, and the requirements for the quality of service of the target business.

Figure 5:
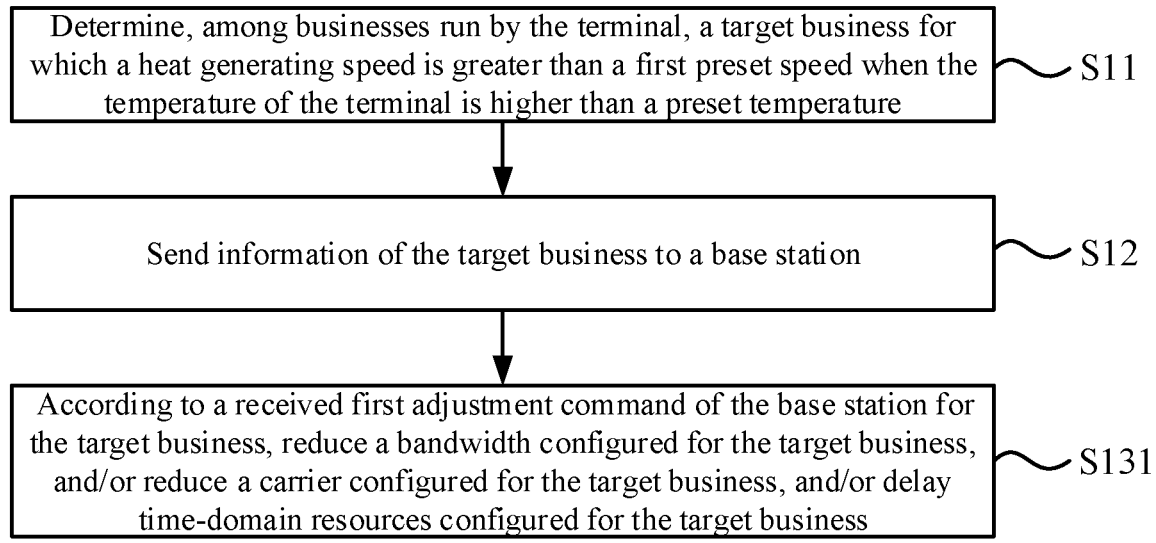
FIG. 5 is a schematic flowchart showing yet another configuration adjustment method according to an example of the present disclosure.

FIG. 5 is a schematic flowchart showing yet another configuration adjustment method according to an example of the present disclosure. As shown in FIG. 5, based on the example shown in FIG. 1, reducing the wireless transmission configuration for the target business includes the following.

In step S131, the bandwidth configured for the target business is reduced, and/or the carrier configured for the target business is reduced, and/or the time-domain resources configured for the target business are delayed.

In one example, for frequency-domain resources, the reducing the wireless transmission configuration refers to reducing the bandwidth configured for the target business, or refers to reducing the carrier configured for the target business. Taking bandwidth as an example, because in general, a wireless transmission through a larger bandwidth requires higher power consumption, by reducing the bandwidth configured for the target business, the power consumption of the target business for wireless communication can be reduced, and the speed at which the terminal generates heat can be further decreased, thereby achieving the effect of dropping the temperature of the terminal.

In one example, for time-domain resources, the reducing the wireless transmission configuration refers to delaying the time-domain resources configured for the target business. Since the overheating of the terminal generally occurs when the terminal run multiple businesses at the same time, by delaying the time-domain resources configured for the target business, the number of the businesses run by the terminal simultaneously can be decreased and the speed at which the terminal generates heat can be further decreased, thereby achieving the effect of dropping the temperature of the terminal.

Figure 6:
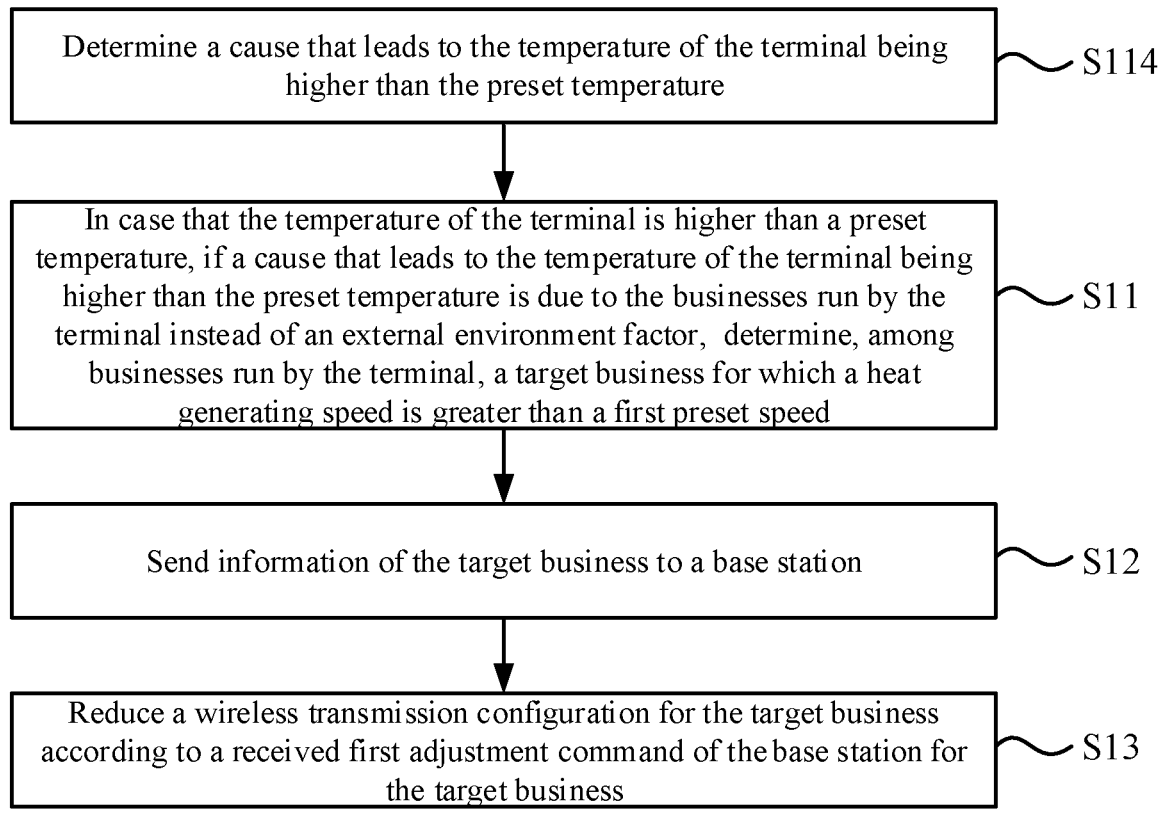
FIG. 6 is a schematic flowchart showing yet another configuration adjustment method according to an example of the present disclosure.

FIG. 6 is a schematic flowchart showing yet another configuration adjustment method according to an example of the present disclosure. As shown in FIG. 6, on the basis of the example shown in FIG. 1, the method further includes the following.

In step S114, before determining, among the businesses run by the terminal, the target business for which the heat generating speed is greater than the first preset speed, a cause that leads to the temperature of the terminal being higher than the preset temperature is determined.

If the cause that leads to the temperature of the terminal being higher than the preset temperature is due to the businesses run by the terminal, the target business for which the heat generating speed is greater than the first preset speed is determined among the businesses run by the terminal.

In one example, the cause of the excessively high temperature of the terminal may be due to the businesses run by the terminal, or may be due to external environmental factors of the terminal, for example, the terminal is placed in a high temperature environment, or the terminal is held in a user's hand for a long time, or the terminal is wrapped in heat insulation objects such as quilt and pillow. These factors all may cause the temperature of the terminal to be higher than the preset temperature.

In such case, the main cause for the overheating of the terminal is not due to too much power consumption of the businesses run by the terminal, and therefore, reducing the wireless transmission configuration for the target business will not solve the terminal overheating problem, but may seriously affect the terminal's communication quality. Therefore, based on this implementation, only when the cause that leads to the terminal's temperature being higher than the preset temperature is due to the businesses run by the terminal instead of an external environmental factor, a target business for which the heat generating speed is greater than the first preset speed is determined among the businesses run by the terminal. In other circumstances, for example, when the cause that leads to the terminal's temperature being higher than the preset temperature is due to an external environmental factor, the process of determining, among the businesses run by the terminal, a target business for which the heat generating speed is greater than the first preset speed is not performed, which does not reduce the wireless transmission configuration for the target business.

Further, if the cause that leads to the terminal's temperature being higher than the preset temperature is due to the businesses run by the terminal, then prompt information, such as sound prompt and light prompt, can be generated so that the user of the terminal can detect it in time and change the situation of the terminal, thereby solving the terminal overheating problem in time.

Figure 7:
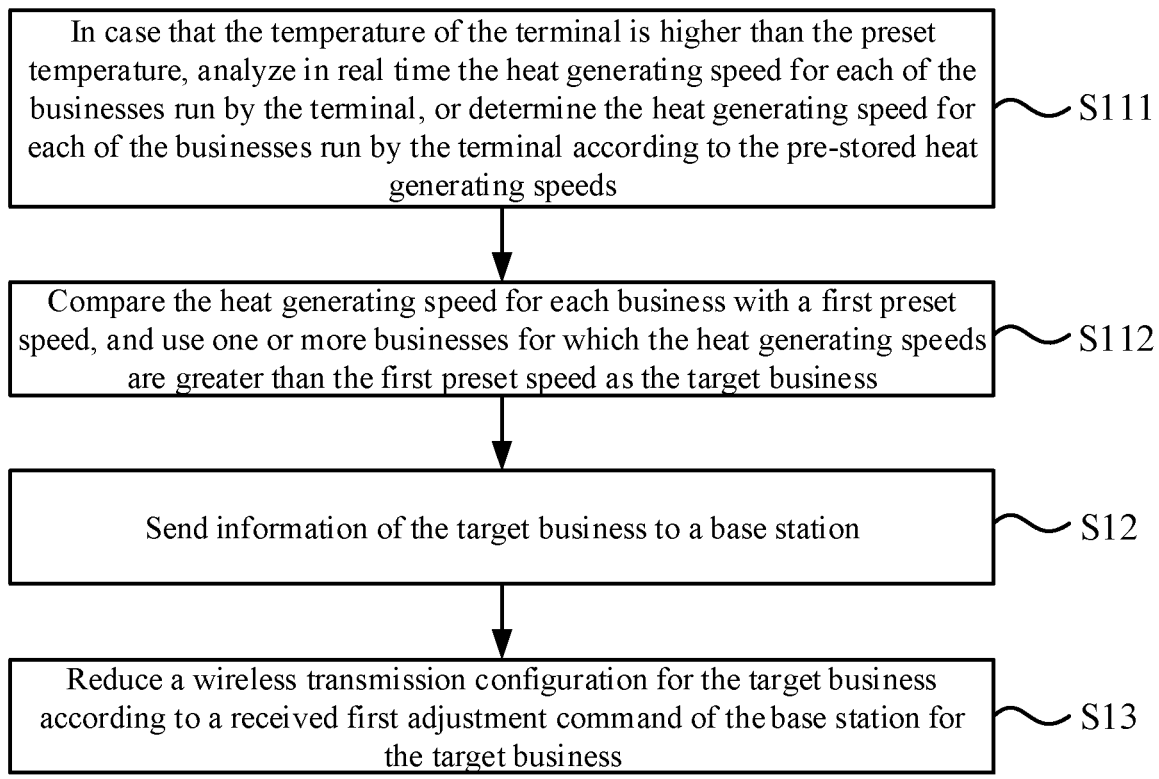
FIG. 7 is a schematic flowchart showing yet another configuration adjustment method according to an example of the present disclosure.

FIG. 7 is a schematic flowchart showing yet another configuration adjustment method according to an example of the present disclosure. As shown in FIG. 7, on the basis of the example shown in FIG. 1, the determining, among the businesses run by the terminal, a target business for which the heat generating speed is greater than the first preset speed includes the following.

In step S111, the heat generating speed for each of the businesses run by the terminal is analyzed in real time, and/or the heat generating speed for each of the businesses run by the terminal is determined according to the pre-stored heat generating speeds.

In step S112, the heat generating speed for each business is compared with a first preset speed, and one or more businesses for which the heat generating speeds are greater than the first preset speed are used as the target business.

In one example, one way of determining the heat generating speed for the business may be real-time analysis, which has a relatively low accuracy in determining the heat generating speed, but needs to consume more terminal resources; or another way may be pre-storing a heat generating speed for each of a plurality of businesses, and determining the heat generating speed for each of the businesses run by the terminal based on the pre-stored heat generating speeds, which does not require too much analysis by the terminal and consumes less terminal resources, but has a relatively low accuracy in determining the heat generating speed.

One of the above determination ways may be selected according to needs, and after determining the heat generating speeds for the businesses, the determined heat generating speed for each business may be compared with the first preset speed, and one ore more businesses for which the heat generating speeds are greater than the first preset speed may be used as the target business. It should be noted that there may be a plurality of businesses that generate heat at a speed greater than the first preset speed, that is, the target business may refer to a plurality of businesses or one business.

In one example, when the target business refers to a plurality of businesses, for each business, the importance level for wireless communication of the terminal may be determined and the importance level may be stored in advance. Further, for each business, a difference between the heat generating speed and the importance level may be calculated, and the obtained difference is compared with a preset difference. For a business where the obtained difference is greater than the preset difference or the obtained difference is the largest, its wireless transmission configuration may be reduced.

Accordingly, the importance of a business and its heat generating speed may be considered comprehensively. For example, for businesses with the same heat generating speed, the higher the importance of the business, the smaller the difference, which can make the terminal tend to reduce the wireless transmission configuration for the business of the lower importance, thereby ensuring the good operation of the terminal to a greater extent.

Figure 8:
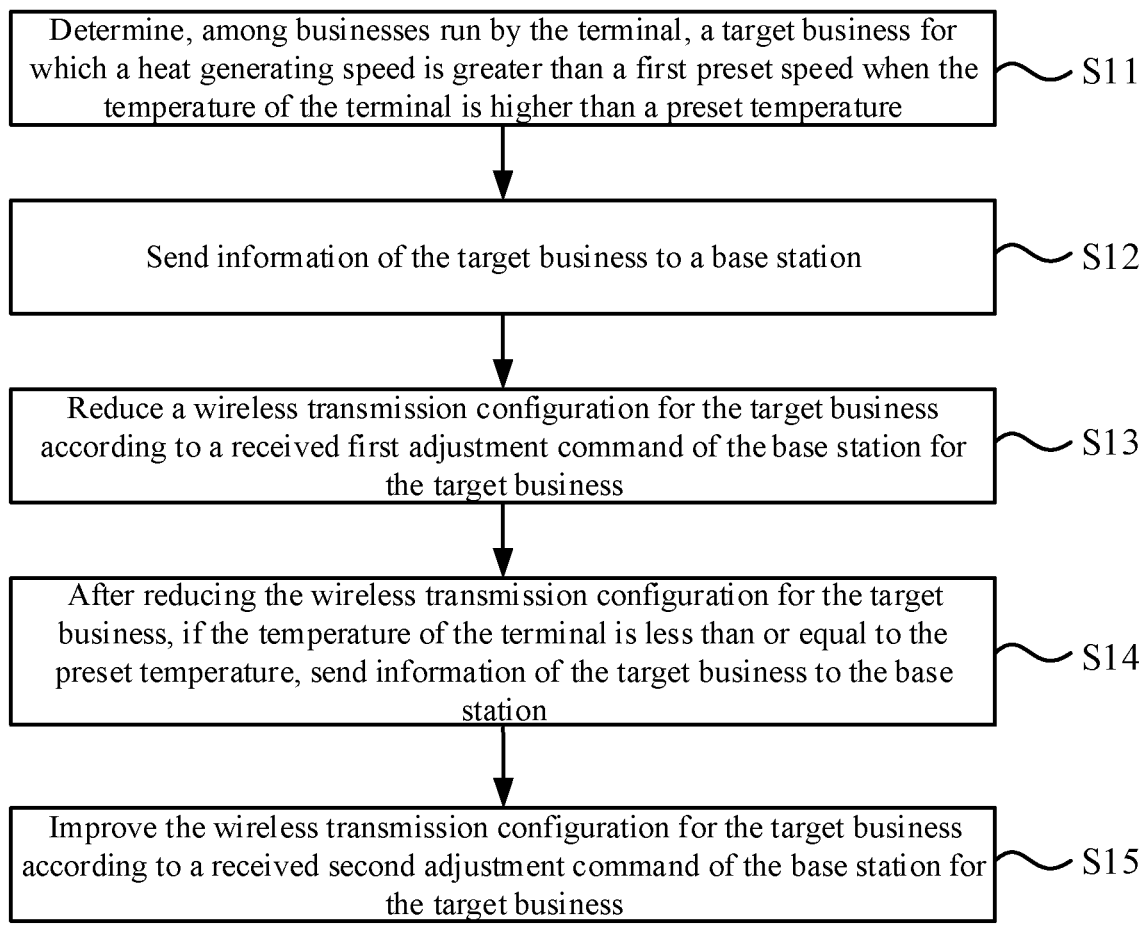
FIG. 8 is a schematic flowchart showing yet another configuration adjustment method according to an example of the present disclosure.

FIG. 8 is a schematic flowchart showing yet another configuration adjustment method according to an example of the present disclosure. As shown in FIG. 8, the method further includes the following.

In step S14, after reducing the wireless transmission configuration for the target business, if the temperature of the terminal is less than or equal to the preset temperature, information of the target business is sent to the base station.

In step S15, the wireless transmission configuration for the target business is improved according to a received second adjustment command of the base station for the target business.

In one example, after the wireless transmission configuration for the target business is reduced, detection of the temperature of the terminal may be continued. If the temperature of the terminal is less than or equal to the preset temperature, that is, the temperature of the terminal returns to normal, information of the target business may be sent to the base station, so as to improve the wireless transmission configuration for the target business according to the second adjustment command generated by the base station, for example, the wireless transmission configuration for the target business may be restored to the level before the reduction. Therefore, it can be ensured that the target business runs with a higher quality of service, thereby guaranteeing that the terminal has a higher communication quality.

Figure 9:
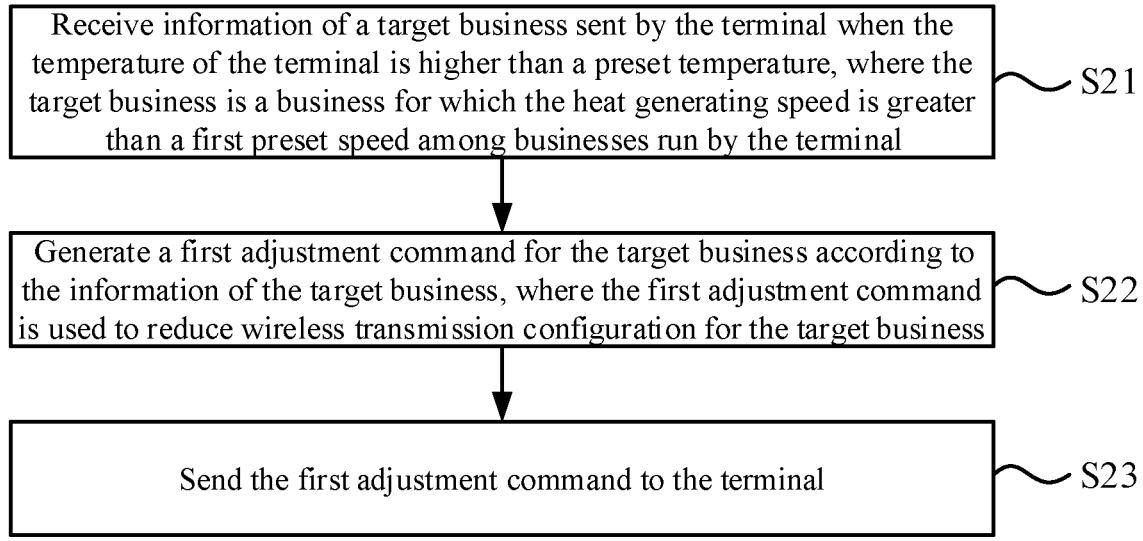
FIG. 9 is a schematic flowchart showing yet another configuration adjustment method according to an example of the present disclosure.

FIG. 9 is a schematic flowchart showing yet another configuration adjustment method according to an example of the present disclosure. The method can be applied to a base station, and the base station can communicate with a terminal as user equipment, where the base station can communicate with the terminal based on 4G LTE technology or 5G NR technology.

As shown in FIG. 9, the configuration adjustment method may include the following steps.

In step S21, information of a target business sent by the terminal when the temperature of the terminal is higher than a preset temperature is received, where the target business is a business for which the heat generating speed is greater than a first preset speed among businesses run by the terminal.

In step S22, a first adjustment command for the target business is generated according to the information of the target business, where the first adjustment command is used to reduce wireless transmission configuration for the target business.

In step S23, the first adjustment command is sent to the terminal.

In one example, the first adjustment command is generated to cause the terminal to reduce the wireless transmission configuration for the target business according to the first adjustment command. Thus, when the temperature of the terminal is high, by reducing the wireless transmission configuration for the target business with a faster heat generating speed, the temperature of the terminal can be dropped as soon as possible, thereby avoiding the security problem due to the overheating of the terminal and ensuring the normal operation of the terminal.

The wireless transmission configuration includes frequency-domain resources for wireless transmission, such as carrier and bandwidth, and may also include time-domain resources for wireless transmission.

For frequency-domain resources, reducing the wireless transmission configuration refers to reducing the bandwidth configured for the target business or reducing the carrier configured for the target business. Take bandwidth as an example, because in general, the wireless transmission through a larger bandwidth requires higher power consumption, by reducing the bandwidth configured for the target business, the power consumption of the target business for wireless communication can be reduced and the speed at which the terminal generates heat can be further decreased, thereby achieving the effect of dropping the temperature of the terminal.

For time-domain resources, reducing the wireless transmission configuration refers to delaying the time-domain resources configured for the target business. Since the overheating of the terminal generally occurs when the terminal runs multiple businesses at the same time, by delaying the time-domain resources configured for the target business, the number of the businesses run by the terminal simultaneously can be decreased and the speed at which the terminal generates heat can be further decreased, thereby achieving the effect of dropping the temperature of the terminal.

Figure 10:
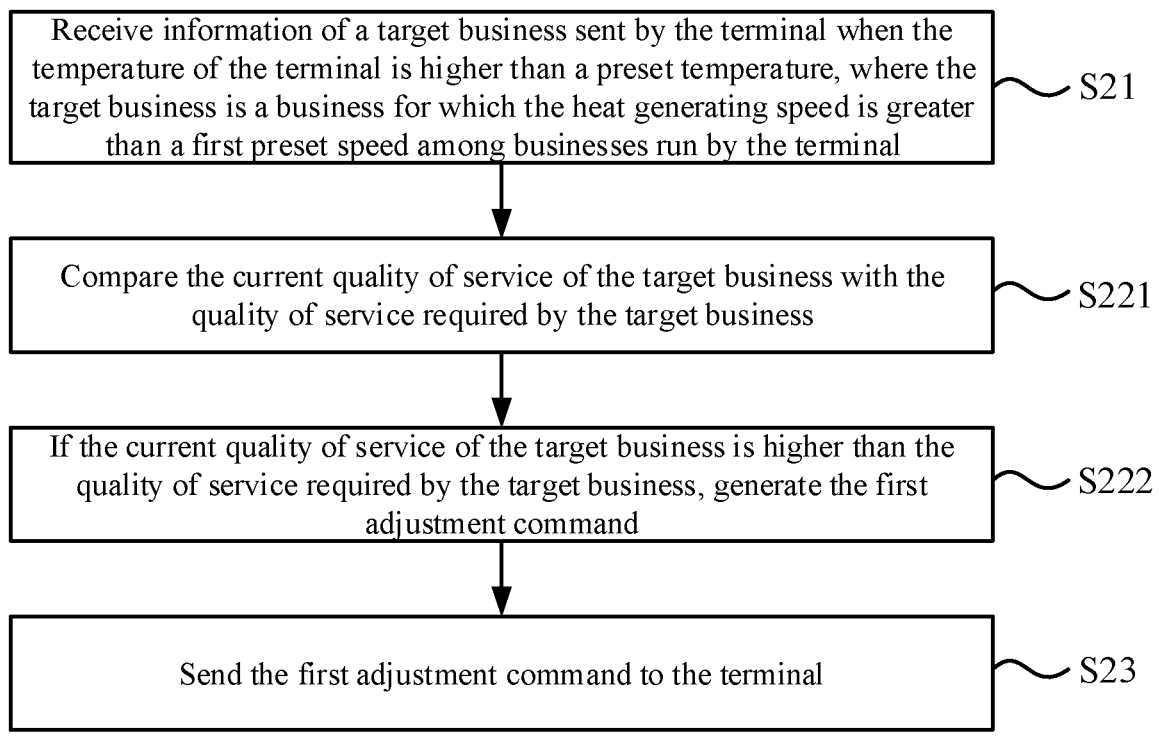
FIG. 10 is a schematic flowchart showing yet another configuration adjustment method according to an example of the present disclosure.

FIG. 10 is a schematic flowchart showing yet another configuration adjustment method according to an example of the present disclosure. The information of the target business includes the identifier of the target business and the current quality of service of the target business. As shown in FIG. 10, on the basis of the example shown in FIG. 9, the generating the first adjustment command for the target business according to the information of the target business includes the following.

In step S221, the current quality of service of the target business is compared with the quality of service required by the target business.

In step S222, if the current quality of service of the target business is higher than the quality of service required by the target business, the first adjustment command is generated.

In an example, the information of the target business sent by the terminal to the base station may include the identifier of the target business and the current quality of service of the target business. In this case, the base station can compare the current quality of service of the target business with the quality of service required by the target business. The quality of service required by the target business refers to the lowest quality of service required during the normal operation of the target business. The quality of service includes transmission speed, transmission delay and so on.

If the current quality of service of the target business is higher than the quality of service required by the target business, it means that the current quality of service of the target business is too high, and there is a certain degree of waste besides that the lowest quality of service required during the normal operation of the target business is met. Taking the transmission speed as an example, the transmission speed is too high means that too much bandwidth is configured for the target business, and therefore, the first adjustment command can be generated to instruct the terminal to reduce the bandwidth configured for the target business.

If the current quality of service of the target business is not higher than the quality of service required by the target business, it means that the current quality of service of the target business is not high, that is, the current quality of service of the target business just meets or does not meet the lowest quality of service required during the normal operation of the target business. Therefore, in order to ensure the normal operation of the target business as much as possible, the wireless transmission configuration for the target business should not be reduced, that is, there is no need to generate the first adjustment command.

Figure 11:
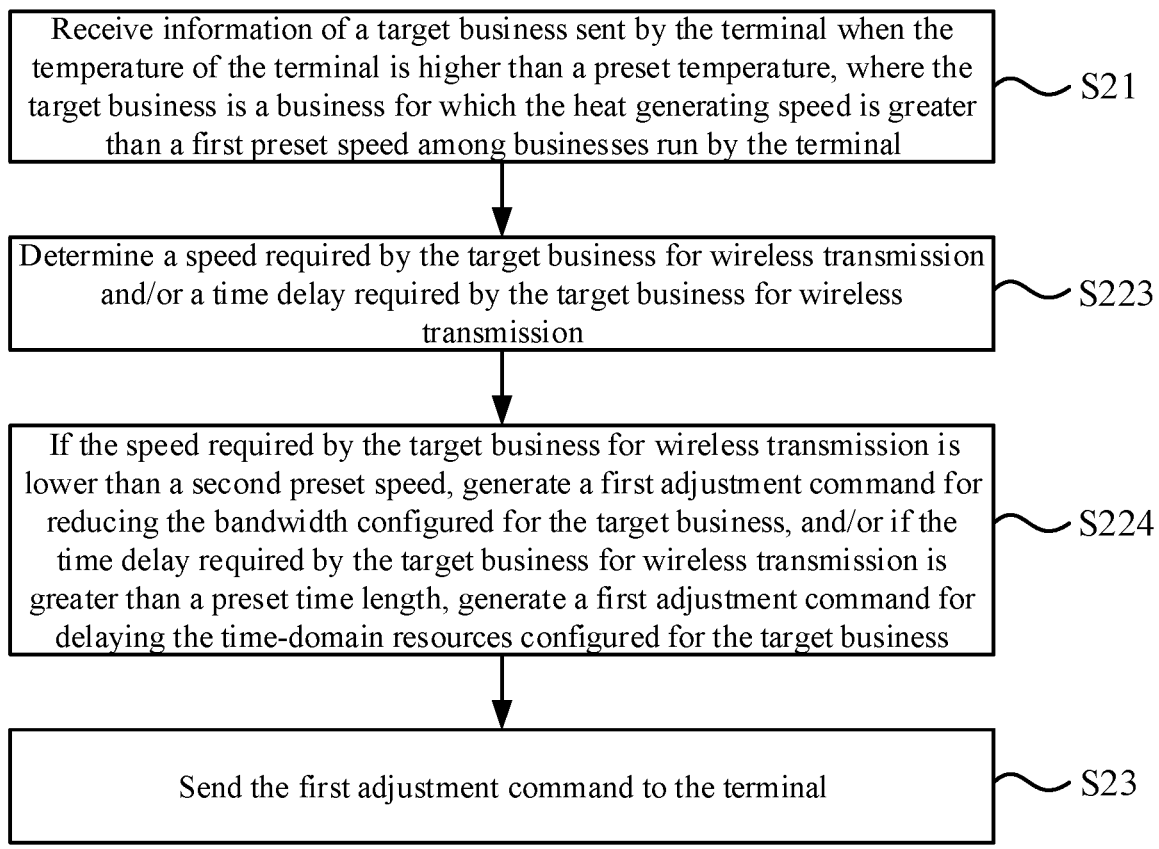
FIG. 11 is a schematic flowchart showing yet another configuration adjustment method according to an example of the present disclosure.

FIG. 11 is a schematic flowchart showing yet another configuration adjustment method according to an example of the present disclosure. As shown in FIG. 11, on the basis of the example shown in FIG. 9, the generating a first adjustment command for the target business according to the information of the target business includes the following.

In step S223, a speed required by the target business for wireless transmission and/or a time delay required by the target business for wireless transmission is determined.

In step S224, if the speed required by the target business for wireless transmission is lower than a second preset speed, a first adjustment command for reducing the bandwidth configured for the target business is generated, and/or if the time delay required by the target business for wireless transmission is greater than a preset time length, a first adjustment command for delaying the time-domain resources configured for the target business is generated.

Figure 12:
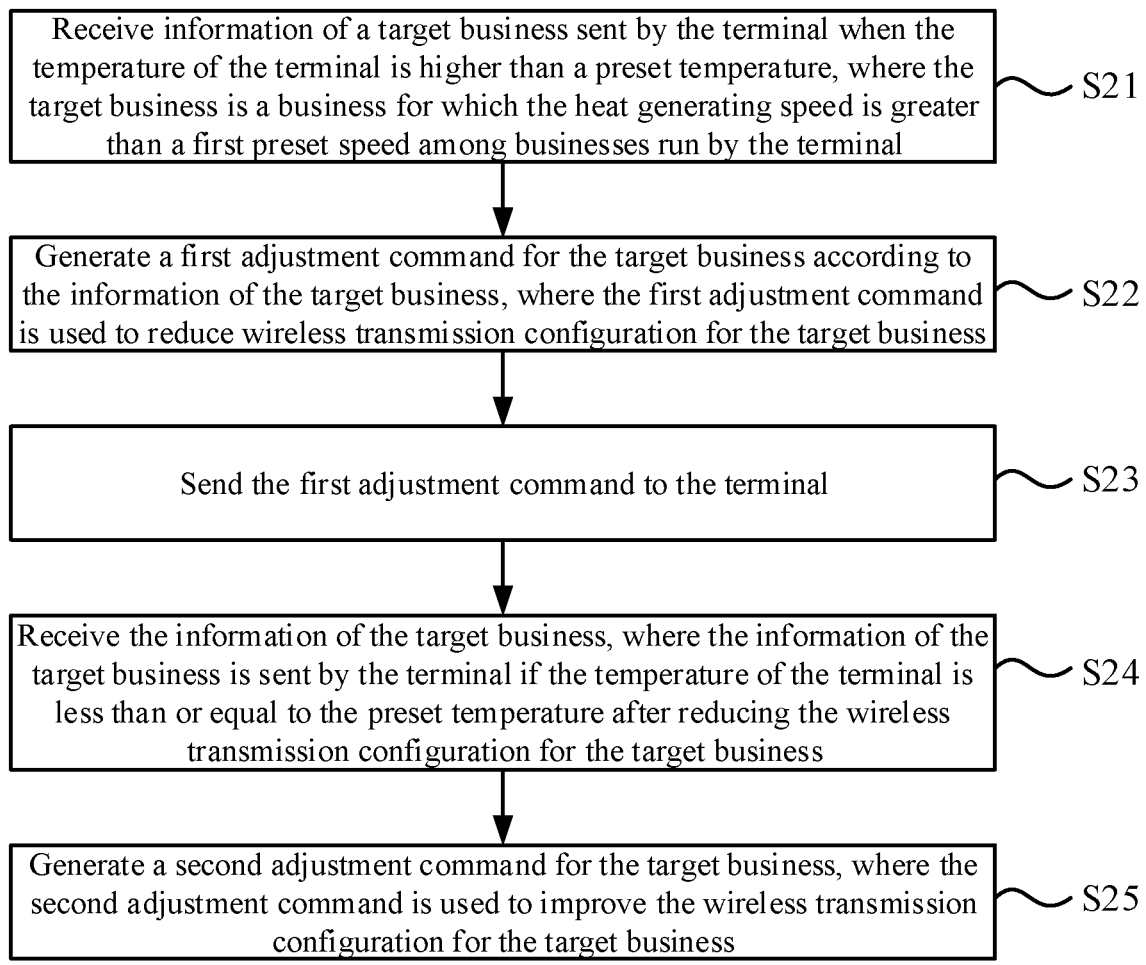
FIG. 12 is a schematic flowchart showing yet another configuration adjustment method according to an example of the present disclosure.

FIG. 12 is a schematic flowchart showing yet another configuration adjustment method according to an example of the present disclosure. As shown in FIG. 12, on the basis of the example shown in FIG. 9, the method further includes the following.

In step S24, the information of the target business is received, where the information of the target business is sent by the terminal if the temperature of the terminal is less than or equal to the preset temperature after reducing the wireless transmission configuration for the target business.

In step S25, a second adjustment command for the target business is generated, where the second adjustment command is used to improve the wireless transmission configuration for the target business.

In one example, after the wireless transmission configuration for the target business is reduced, detection of the temperature of the terminal may be continued. If the temperature of the terminal is less than or equal to the preset temperature, that is, the temperature of the terminal returns to normal, the information of the target business can be sent to the base station so that the base station may further generate a second adjustment command. The terminal may improve the wireless transmission configuration for the target business based on the second adjustment command, for example, restoring the wireless transmission configuration of the target business to the level before the reduction. Therefore, it can be ensured that the target business runs with a higher quality of service, thereby guaranteeing that the terminal has a higher communication quality.

Corresponding to the foregoing example of the configuration adjustment method, the present disclosure also provides an example of a configuration adjustment apparatus.

Figure 13:
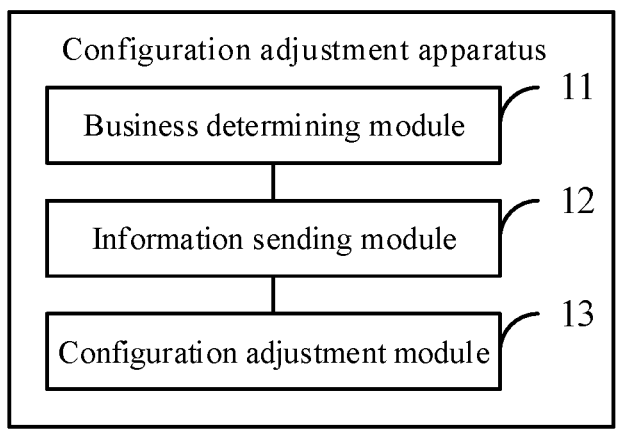
FIG. 13 is a schematic block diagram showing a configuration adjustment apparatus according to an example of the present disclosure.

FIG. 13 is a schematic block diagram showing a configuration adjustment apparatus according to an example of the present disclosure. The apparatus can be applied to a terminal. The terminal can be used as user equipment to communicate with a base station. The terminal includes but not limited to electronic devices such as mobile phones, tablets, and wearable devices. The terminal can communicate with the base station based on 4G LTE technology, and can also communicate with base station based on 5G NR technology.

As shown in FIG. 13, the configuration adjustment device may include:
  a business determining module 11 configured to determine, among businesses run by the terminal, a target business for which a heat generating speed is greater than a first preset speed, when a temperature of the terminal is higher than a preset temperature;
  an information sending module 12 configured to send information of the target business to a base station;
  a configuration adjustment module 13 configured to reduce a wireless transmission configuration for the target business according to a received first adjustment command of the base station for the target business.

In some examples, the information sending module is configured to send an identifier of the target business to the base station.

In some examples, the information sending module is configured to send an identifier of the target business and a current quality of service of the target business to the base station.

Figure 14:
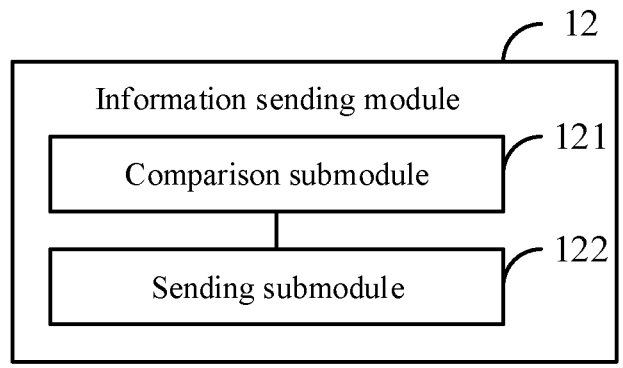
FIG. 14 is a schematic block diagram showing an information sending module according to an example of the present disclosure.

FIG. 14 is a schematic block diagram showing an information sending module according to an example of the present disclosure. As shown in FIG. 14, based on the example shown in FIG. 13, the information sending module 12 includes:
  a comparison submodule 121 configured to compare a current quality of service of the target business with a quality of service required by the target business;
  a sending submodule 122 configured to send an identifier of the target business to the base station if the current quality of service of the target business is higher than the quality of service required by the target business.

Figure 15:
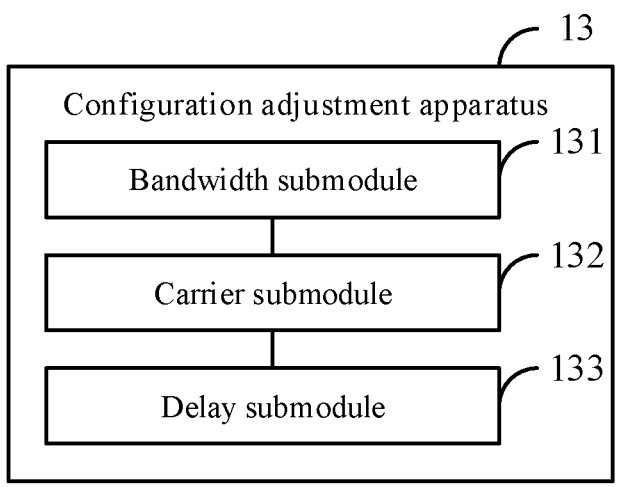
FIG. 15 is a schematic block diagram showing a configuration adjustment module according to an example of the present disclosure.

FIG. 15 is a schematic block diagram showing a configuration adjustment module according to an example of the present disclosure. As shown in FIG. 15, based on the example shown in FIG. 13, the configuration adjustment module 13 includes:
  a bandwidth submodule 131 configured to reduce a bandwidth configured for the target business; and/or
  a carrier submodule 132 configured to reduce a carrier configured for the target business; and/or
  a delay submodule 133 configured to delay time-domain resources configured for the target business.

It should be noted that the configuration adjustment module 13 may be as shown in FIG. 15, including the bandwidth submodule 131, the carrier submodule 132, and the delay submodule 133, and may also include one or two modules of the bandwidth submodule 131, the carrier submodule 132, and the delay submodule 133.

Figure 16:
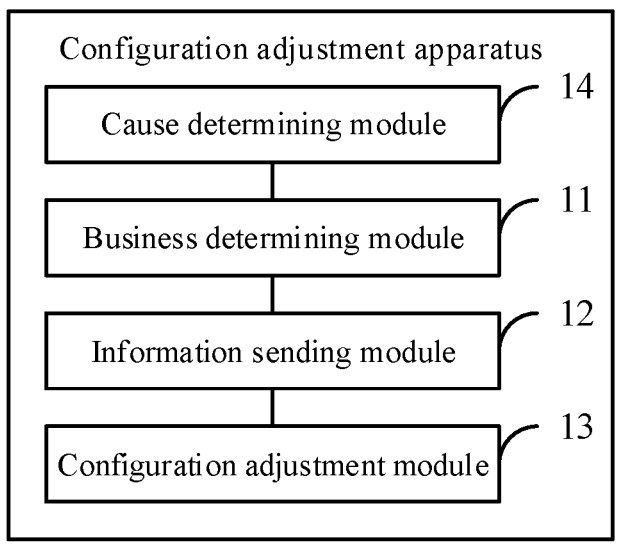
FIG. 16 is a schematic block diagram showing another configuration adjustment apparatus according to an example of the present disclosure.

FIG. 16 is a schematic block diagram showing another configuration adjustment device according to an example of the present disclosure. As shown in FIG. 16, based on the example shown in FIG. 13, the configuration adjustment apparatus further includes:
  a cause determining module 14 configured to determine a cause that leads to the temperature of the terminal being higher than the preset temperature before determining, among the businesses run by the terminal, the target business for which the heat generating speed is greater than the first preset speed;
  wherein the business determining module 11 is configured to determine, among the businesses run by the terminal, the target business for which the heat generating speed is greater than the first preset speed in response to that the cause that leads to the temperature of the terminal being higher than the preset temperature is due to the businesses run by the terminal.

Figure 17:
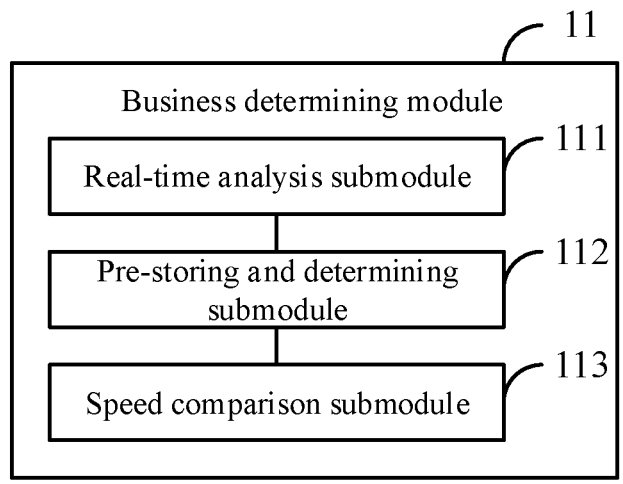
FIG. 17 is a schematic block diagram showing a business determining module according to an example of the present disclosure.

FIG. 17 is a schematic block diagram showing a business determining module according to an example of the present disclosure. As shown in FIG. 17, based on the example shown in FIG. 13, the business determining module 11 includes:
  a real-time analysis submodule 111 configured to analyze in real time the heat generating speed for each of the businesses run by the terminal; and/or
  a pre-storing and determining submodule 112 configured to determine the heat generating speed for each of the businesses run by the terminal according to pre-stored heat generating speeds for the businesses;
  a speed comparison submodule 113 configured to compare the heat generating speed for each of the businesses with the first preset speed, and use one or more businesses for which the heat generating speeds are greater than the first preset speed as the target business.

In some examples, the information sending module is further configured to send information of the target business to the base station if the temperature of the terminal is less than or equal to the preset temperature after the wireless transmission configuration for the target business is reduced;

the configuration adjustment module is further configured to improve the wireless transmission configuration for the target business according to a received second adjustment command of the base station for the target business.

Figure 18:
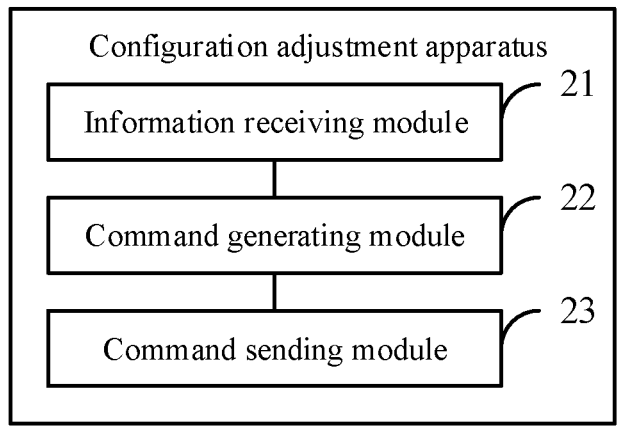
FIG. 18 is a schematic block diagram showing still another configuration adjustment apparatus according to an example of the present disclosure.

FIG. 18 is a schematic block diagram showing still another configuration adjustment apparatus according to an example of the present disclosure. The apparatus can be applied to a base station, and the base station can communicate with a terminal as user equipment, where the base station can communicate with the terminal based on 4G LTE technology, or can communicate with the terminal based on 5G NR technology.

As shown in FIG. 18, the configuration adjustment apparatus may include:
- an information receiving module 21 configured to receive information of a target business which is sent by a terminal when a temperature of the terminal is higher than a preset temperature, wherein the target business is a business for which a heat generating speed is greater than a first preset speed among businesses run by the terminal;
- a command generating module 22 configured to generate a first adjustment command for the target business according to the information of the target business, wherein the first adjustment command is used to reduce a wireless transmission configuration for the target business;
- a command sending module 23 configured to send the first adjustment command to the terminal.

Figure 19:
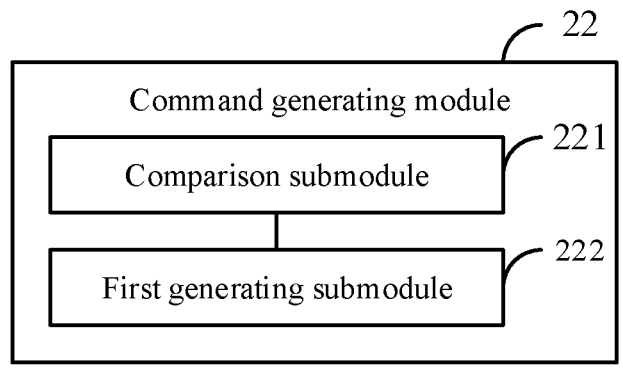
FIG. 19 is a schematic block diagram showing a command generation module according to an example of the present disclosure.

FIG. 19 is a schematic block diagram showing a command generation module according to an example of the present disclosure. The information of the target business includes the identifier of the target business and the current quality of service of the target business. As shown in FIG. 19, based on the example shown in FIG. 18, the command generation module 22 includes:
- a comparison submodule 221 configured to compare the current quality of service of the target business with a quality of service required by the target business;
- a first generating submodule 222 configured to generate the first adjustment command if the current quality of service of the target business is higher than the quality of service required by the target business.

Figure 20:
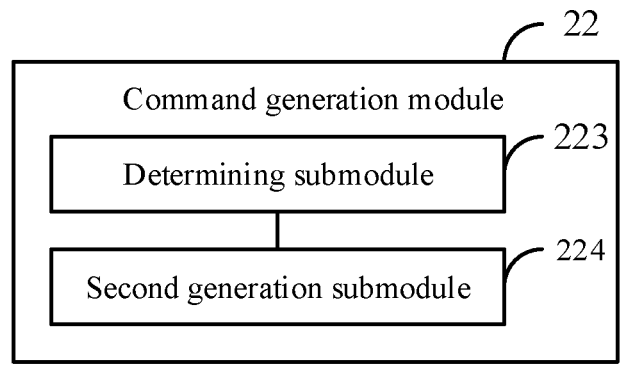
FIG. 20 is a schematic block diagram showing another command generation module according to an example of the present disclosure.

FIG. 20 is a schematic block diagram showing another command generation module according to an example of the present disclosure. As shown in FIG. 20, based on the example shown in FIG. 18, the command generation module 22 includes:
- a determining submodule 223 configured to determine a speed required by the target business for wireless transmission and/or a time delay required by the target business for wireless transmission;
- a second generation submodule 224 configured to, if the speed required by the target business for wireless transmission is lower than a second preset speed, generate the first adjustment command for reducing a bandwidth configured for the target business, and/or if the time delay required by the target business for wireless transmission is greater than a preset time length, generate the first adjustment command for delaying time-domain resources configured for the target business.

In some examples, the information receiving module is further configured to receive information of the target business which is sent by the terminal when the temperature of the terminal is less than or equal to the preset temperature after the wireless transmission configuration for the target business is reduced;

the command generation module is further configured to generate a second adjustment command for the target business, wherein the second adjustment command is used to improve the wireless transmission configuration for the target business.

The specific manners in which the respective modules of the apparatus in the above examples operate have been described in detail in the related method examples, and will not be elaborated here.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

An example of the present disclosure further provides an electronic device, including:
- a processor; and
- a memory configured to store instructions executable by the processor;

where the processor is configured to execute the configuration adjustment method described in any of the foregoing examples.

The example of the present disclosure also proposes a computer-readable storage medium on which a computer program is stored, and when the program is executed by a processor, the configuration adjustment method described in any of the foregoing examples is implemented.

Figure 21:
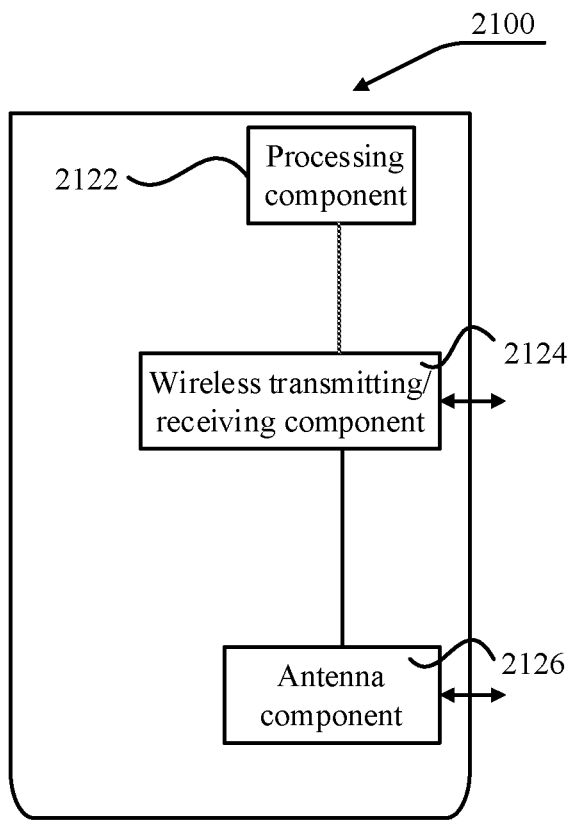
FIG. 21 is a schematic structural diagram showing an apparatus for configuration adjustment according to an example of the present disclosure.

As shown in FIG. 21, FIG. 21 is a schematic structural diagram of an apparatus 2100 for configuration adjustment according to an example of the present disclosure. The apparatus 2100 may be provided as a base station. Referring to FIG. 21, the apparatus 2100 includes a processing component 2122, a wireless transmitting/receiving component 2124, an antenna component 2126, and a signal processing portion specific to a wireless interface. The processing component 2122 may further include one or more processors. One of the processors in the processing component 2122 may be configured to execute the configuration adjustment method described in any of the examples in FIG. 9 to FIG. 12.

Figure 22:
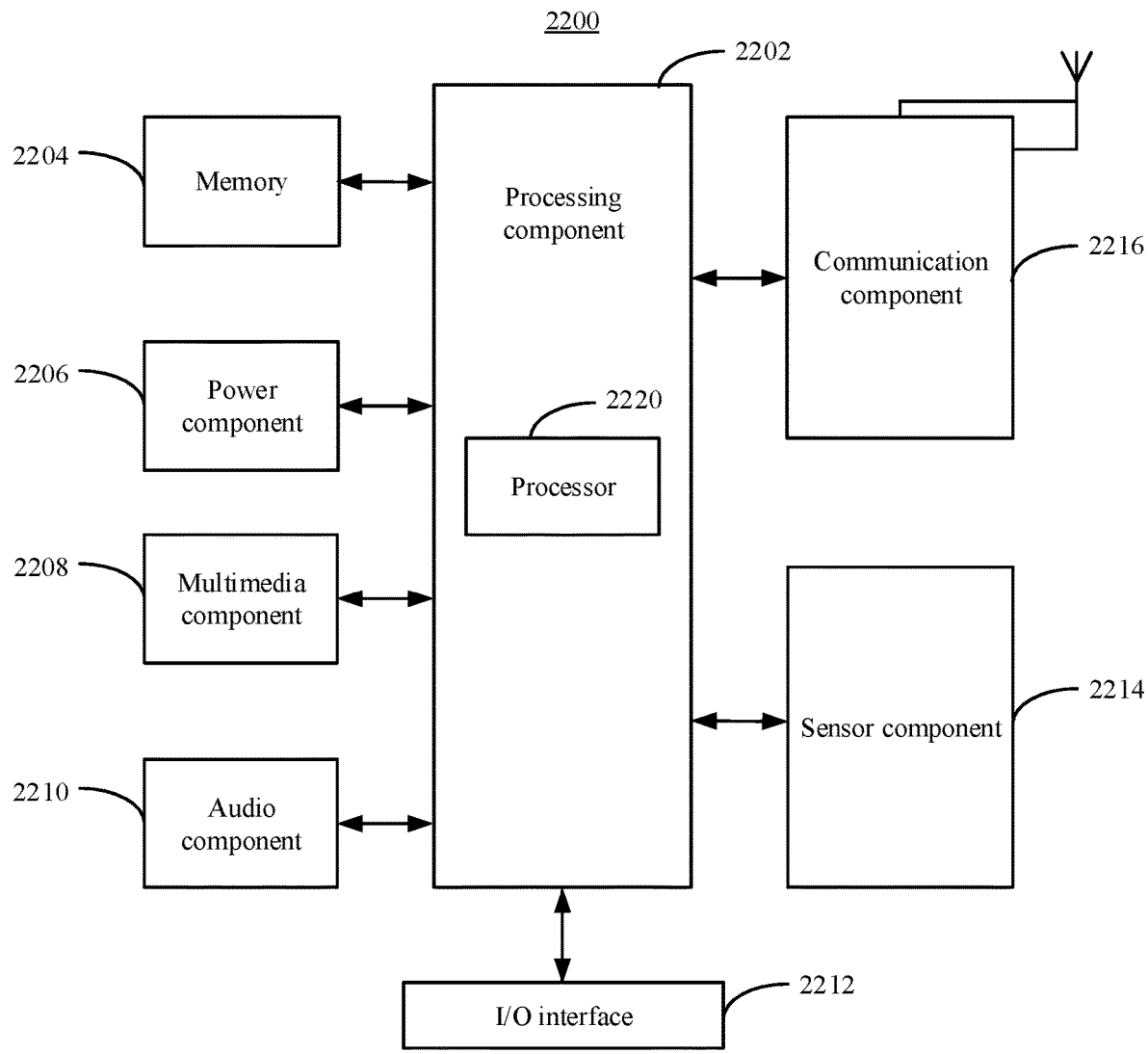
FIG. 22 is a schematic structural diagram showing another apparatus for configuration adjustment according to an example of the present disclosure.

FIG. 22 is a schematic block diagram showing an apparatus 2200 for configuration adjustment according to an example of the present disclosure. For example, the apparatus 2200 may be a mobile phone, a computer, a digital broadcasting terminal, a messaging device, a game console, a tablet device, a medical device, a fitness device, a personal digital assistant, etc.

Referring to FIG. 22, the apparatus 2200 may include one or more of the following components: a processing component 2202, a memory 2204, a power component 2206, a multimedia component 2208, an audio component 2210, an input/output (I/O) interface 2212, a sensor component 2214, and a communication component 2216.

The processing component 2202 usually controls the overall operation of the apparatus 2200, such as operations associated with display, telephone calls, data communications, camera operations, and recording operations. The processing component 2202 may include one or more processors 2220 to execute instructions to complete all or part of the steps of the above methods. Moreover, the processing component 2202 may include one or more modules to facilitate interaction between the processing component 2202 and other components. For example, the processing component 2202 may include a multimedia module to facilitate the interaction between the multimedia component 2208 and the processing component 2202.

The memory 2204 is configured to store various types of data to support the operation of the apparatus 2200. Examples of these data include instructions for any application or method operating at the apparatus 2200, contact data, phone book data, messages, pictures, videos, and the like. The memory 2204 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 2206 provides power to various components of the apparatus 2200. The power component 2206 may include a power management system, one or more power sources, and other components associated with power generated, managed, and distributed for the apparatus 2200.

The multimedia component 2208 includes a screen that provides an output interface between the apparatus 2200 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2208 includes a front camera and/or a rear camera. The front camera and/or rear camera may receive external multimedia data when the apparatus 2200 is in an operating mode, such as a photographing mode or a video mode. Each of the front and rear cameras may be a fixed optical lens system or have a focal length and an optical zoom capability.

The audio component 2210 is configured to output and/or input audio signals. For example, the audio component 2210 includes a microphone (MIC) configured to receive an external audio signal when the apparatus 2200 is in an operation mode, such as a call mode, a recording mode, and a voice recognition mode. The received audio signal may be further stored in the memory 2204 or transmitted via the communication component 2216. In some examples, the audio component 2210 also includes a loudspeaker for outputting an audio signal.

The I/O interface 2212 provides an interface between the processing component 2202 and a peripheral interface module which may be a keyboard, a click wheel, a button, or the like. These buttons may include, but are not limited to a home button, a volume button, a start button, and a lock button.

The sensor component 2214 includes one or more sensors for providing a status assessment in various aspects to the apparatus 2200. For example, the sensor component 2214 may detect the on/off status of the apparatus 2200, and relative positioning of component, for example, the component is a display and a keypad of the apparatus 2200. The sensor component 2214 may also detect a change in position of the apparatus 2200 or a component of the apparatus 2200, a presence or absence of the contact between a user and the apparatus 2200, an orientation or an acceleration/deceleration of the apparatus 2200, and a change in temperature of the apparatus 2200. The sensor component 2214 may include a proximity sensor configured to detect the presence of nearby objects without any physical contact. The sensor component 2214 may also include a light sensor, such as a CMOS or CCD image sensor, for use in imaging applications. In some examples, the sensor component 2214 may also include an acceleration sensor, a gyro sensor, a magnetic sensor, a pressure sensor, or a temperature sensor.

The communication component 2216 is configured to facilitate wired or wireless communication between the apparatus 2200 and other devices. The apparatus 2200 may access a wireless network based on a communication standard, such as WiFi, 2G or 3G, or a combination thereof. In an example, the communication component 2216 receives a broadcast signal or broadcast related information from an external broadcast management system via a broadcast channel. In an example, the communication component 2216 may further include a Near Field Communication (NFC) module for promoting short-range communication. For example, the NFC module may be implemented based on a radio frequency identifier (RFID) technology, an infrared data association (IrDA) technology, an ultra wide band (UWB) technology, a Bluetooth (BT) technology, and other technologies.

In an example, the apparatus 2200 may be implemented by one or more application specific integrated circuits (ASIC), digital signal processors (DSP), digital signal processing equipment (DSPD), programmable logic devices (PLD), field programmable gate array (FPGA), a controller, a microcontroller, a microprocessor, or other electronic components to execute the configuration adjustment method described in any one of the examples in FIGS. 1 to 8 above.

In an example, there is also provided a non-transitory computer-readable storage medium including instructions, such as a memory 2204 including instructions, which can be executed by the processor 2220 of the apparatus 2200 to complete the above methods. For example, the non-transitory computer-readable storage medium may be a ROM, a random access memory (RAM), a CD-ROM, a magnetic tape, a floppy disk, and an optical data storage device.

Other examples of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The methods and apparatuses provided by the examples of the present disclosure have been described in detail above. Specific examples are used to explain the principles and implementations of the present disclosure. At the same time, those of ordinary skill in the art may apply some changes in the specific implementation and the scope of application based on the idea of the present disclosure. In conclusion, the content of the present specification should not be construed as any limitation to the present disclosure.

What is claimed is:

1. A configuration adjustment method, performed by a terminal, the method comprising:
   determining, among businesses run by the terminal, a target business for which a heat generating speed is greater than a first preset speed, when a temperature of the terminal is higher than a preset temperature;
   sending information of the target business to a base station;
   reducing a wireless transmission configuration for the target business according to a received first adjustment command of the base station for the target business;
   wherein the sending the information of the target business to the base station comprises:
   comparing a current quality of service of the target business with a quality of service required by the target business, wherein the quality of service required by the target business refers to a lowest quality of service required during normal operation of the target business;
   in response to the current quality of service of the target business being higher than the quality of service required by the target business, sending an identifier of the target business to the base station.

2. The method according to claim 1, wherein the sending the information of the target business to the base station further comprises:
   sending the current quality of service of the target business to the base station.

3. The method according to claim 1, wherein the reducing the wireless transmission configuration for the target business comprises:
   reducing a bandwidth configured for the target business, and/or reducing a carrier configured for the target business, and/or delaying time-domain resources configured for the target business.

4. The method according to claim 1, further comprising:
   prior to the determining, among the businesses run by the terminal, the target business for which the heat generating speed is greater than the first preset speed,
   determining a cause that leads to the temperature of the terminal being higher than the preset temperature;
   wherein in response to that the cause that leads to the temperature of the terminal being higher than the preset temperature is due to the businesses run by the terminal,
   determining, among the businesses run by the terminal, the target business for which the heat generating speed is greater than the first preset speed.

5. The method according to claim 1, wherein the determining, among the businesses run by the terminal, the target business for which the heat generating speed is greater than the first preset speed comprises:
   analyzing in real time the heat generating speed for each of the businesses run by the terminal, and/or determining the heat generating speed for each of the businesses run by the terminal according to pre-stored heat generating speeds for the businesses;
   comparing the heat generating speed for each of the businesses with the first preset speed, and using one or more businesses for which the heat generating speeds are greater than the first preset speed as the target business.

6. The method according to claim 1, further comprising:
   after the reducing the wireless transmission configuration for the target business, in response to that the temperature of the terminal is less than or equal to the preset temperature, sending information of the target business to the base station; and
   improving the wireless transmission configuration for the target business according to a received second adjustment command of the base station for the target business.

7. A configuration adjustment method, performed by a base station, the method comprising:
   receiving information of a target business which is sent by a terminal when a temperature of the terminal is higher than a preset temperature, wherein the target business is a business for which a heat generating speed is greater than a first preset speed among businesses run by the terminal;
   generating a first adjustment command for the target business according to the information of the target business, wherein the first adjustment command is used to reduce a wireless transmission configuration for the target business; and
   sending the first adjustment command to the terminal;
   wherein the information of the target business includes an identifier of the target business and a current quality of service of the target business,
   the generating the first adjustment command for the target business according to the information of the target business comprises:
   comparing the current quality of service of the target business with a quality of service required by the target business, wherein the quality of service required by the target business refers to a lowest quality of service required during normal operation of the target business;
   in response to the current quality of service of the target business being higher than the quality of service required by the target business, generating the first adjustment command.

8. The method according to claim 7, wherein the generating the first adjustment command further comprises:
   determining a speed required by the target business for wireless transmission and/or a time delay required by the target business for wireless transmission;
   in response to that the speed required by the target business for wireless transmission is lower than a second preset speed, generating the first adjustment command for reducing a bandwidth configured for the target business, and/or
   in response to that the time delay required by the target business for wireless transmission is greater than a preset time length, generating the first adjustment command for delaying time-domain resources configured for the target business.

9. The method according to claim 7, further comprising:
receiving information of the target business which is sent by the terminal when the temperature of the terminal is less than or equal to the preset temperature after the wireless transmission configuration for the target business is reduced;
generating a second adjustment command for the target business, wherein the second adjustment command is used to improve a wireless transmission configuration for the target business.

10. A terminal, comprising:
a processor; and
memory configured to store instructions executable by the processor;
wherein the processor is configured to:
determine, among businesses run by the terminal, a target business for which a heat generating speed is greater than a first preset speed, when a temperature of the terminal is higher than a preset temperature;
send information of the target business to a base station;
reduce a wireless transmission configuration for the target business according to a received first adjustment command of the base station for the target business;
wherein when sending the information of the target business to the base station, the processor is further configured to:
compare a current quality of service of the target business with a quality of service required by the target business, wherein the quality of service required by the target business refers to a lowest quality of service required during normal operation of the target business;
in response to the current quality of service of the target business being higher than the quality of service required by the target business, send an identifier of the target business to the base station.

11. The terminal according to claim 10, wherein when sending the information of the target business to the base station, the processor is configured to:
send the current quality of service of the target business to the base station.

12. The terminal according to claim 10, wherein when reducing the wireless transmission configuration for the target business, the processor is configured to:
reduce a bandwidth configured for the target business, and/or reduce a carrier configured for the target business, and/or delay time-domain resources configured for the target business.

13. The terminal according to claim 10, wherein the processor is further configured to:
prior to the determining, among the businesses run by the terminal, the target business for which the heat generating speed is greater than the first preset speed, determine a cause that leads to the temperature of the terminal being higher than the preset temperature;
wherein in response to that the cause that leads to the temperature of the terminal being higher than the preset temperature is due to the businesses run by the terminal,
determine, among the businesses run by the terminal, the target business for which the heat generating speed is greater than the first preset speed.

14. The terminal according to claim 10, wherein when determining, among the businesses run by the terminal, the target business for which the heat generating speed is greater than the first preset speed, the processor is configured to:
analyze in real time the heat generating speed for each of the businesses run by the terminal, and/or determine the heat generating speed for each of the businesses run by the terminal according to pre-stored heat generating speeds for the businesses;
compare the heat generating speed for each of the businesses with the first preset speed, and use one or more businesses for which the heat generating speeds are greater than the first preset speed as the target business.

15. The terminal according to claim 10, wherein the processor is further configured to:
after the reducing the wireless transmission configuration for the target business, in response to that the temperature of the terminal is less than or equal to the preset temperature, send information of the target business to the base station; and
improve the wireless transmission configuration for the target business according to a received second adjustment command of the base station for the target business.

* * * * *